United States Patent Office 3,167,545
Patented Jan. 26, 1965

3,167,545
16β-METHYL - 16α,17α - DIHYDROXY PREGNENES AND THE 16α,17α-CYCLIC KETALS AND ACETALS THEREOF
George Rosenkranz and Mercedes Velasco, Mexico City, Mexico, assignors, by mesne assignments, to Syntex Corporation, a corporation of Panama
No Drawing. Filed Feb. 5, 1960, Ser. No. 6,851
Claims priority, application Mexico Feb. 7, 1959
24 Claims. (Cl. 260—239.55)

The present invention relates to novel cyclopentanophenanthrene compounds and to a novel process for the production thereof.

More particularly the invention relates to 16β-methyl-16α-hydroxy derivatives of Δ4-pregnene-17α,21-diol-3,20-dione and to 16β-methyl-16α-hydroxy derivatives of Δ4-pregnene-17α,21-diol-3,20-dione and Δ1,4-pregnadiene-17α,21-diol-3,20-dione having a keto or β-hydroxyl group at C–11, as well as to the 16α,17α-cyclic ketals and acetals and to the 21-esters thereof.

The novel compounds of the present invention are potent cortical hormones which have anti-inflammatory and glycogenic activity. The novel 16β-methyl-16α-hydroxy derivative of Δ4-pregnene-17α,21-diol-3,20-dione and the 16α,17α-cyclic acetals and ketals are also useful as intermediates which can be converted into the valuable compounds oxygenated at C–11 by known biochemical methods as hereinafter described.

The novel compounds of the present invention may be illustrated by the following formulas:

and

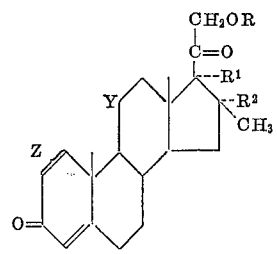

In the above formulae, Y represents keto or β-hydroxy. Z indicates a double bond between C–1 and C–2 and a saturated linkage between C–1 and C–2. R represents hydrogen or a hydrocarbon carboxylic acyl group containing from 1 to 12 carbon atoms. R' and R² each represent hydroxy and jointly R' and R² may represent the grouping

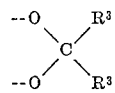

in which R³ represents hydrogen or hydrocarbon groups such as aliphatic radicals containing from 1 to 8 carbon atoms or aromatic groups containing 6 to 12 carbon atoms. Such ketals or acetals are formed by reaction of the 16α,17α-dihydroxy compounds with an aldehyde or ketone such as formaldehyde, acetaldehyde, benzaldehyde, acetone, butanone or cyclohexanone in the presence of catalytic amounts of perchloric acid.

The acyl group is derived from a hydrocarbon carboxylic acid containing from 1 to 12 carbon atoms, saturated or unsaturated, straight chain or branched chain aliphatic, cyclic, cyclic-aliphatic, aromatic and may be substituted as by hydroxy, alkoxy containing 1 to 5 carbon atoms, acyloxy containing 1 to 12 carbon atoms, or halogen such as chlorine or fluorine. Typical ester groups are the acetate, butyrate, propionate, hemisuccinate, enanthate, caproate, benzoate, trimethylacetate, phenoxyacetate, phenylpropionate, cyclopentylpropionate and β-chloropropionate.

The following equation serves to illustrate in part the preparation of the novel compounds of the present invention:

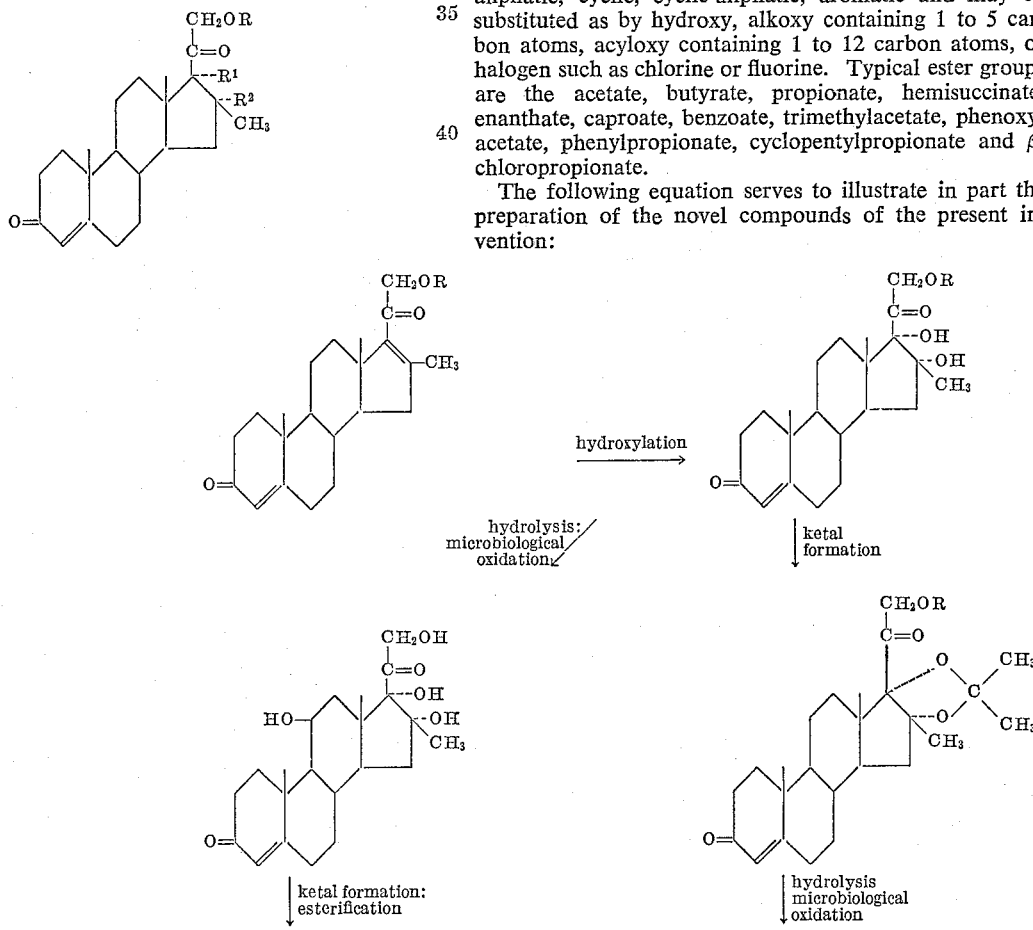

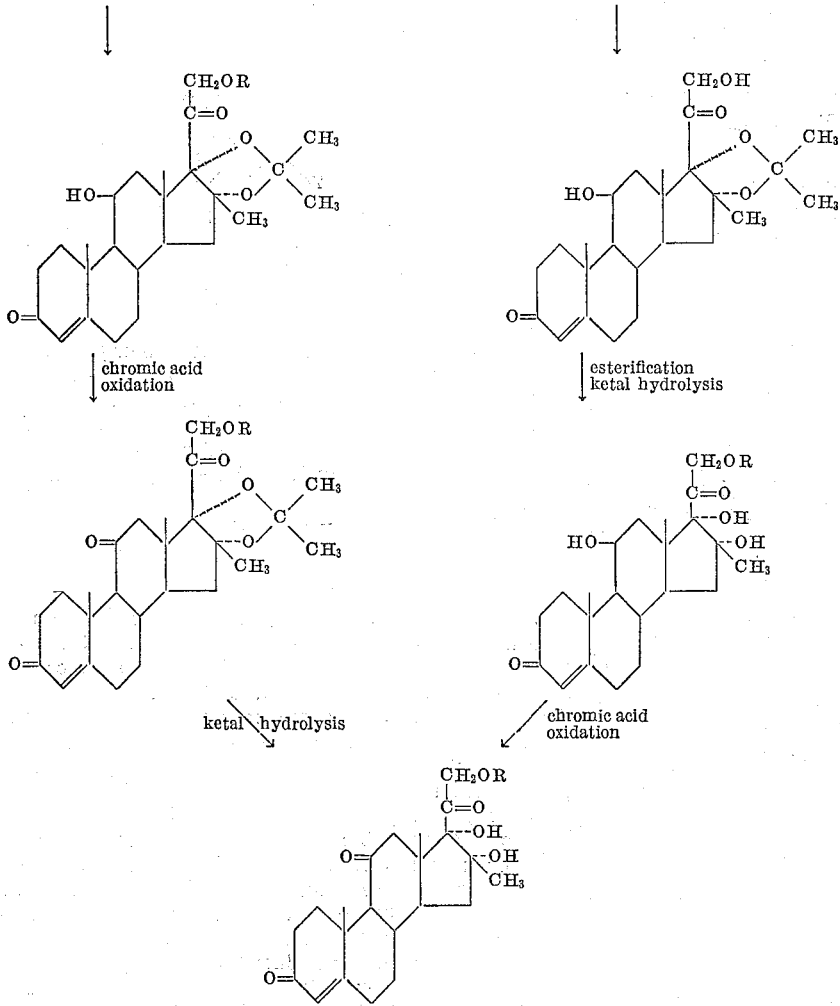

In the above formulae, R represents the same group as previously set forth.

In practicing the process outlined above, the known 16-methyl-16-dehydro-progesterone (Wettstein, Helv. Chim. Acta, XXVII, 1803 (1944)) is subjected to monoiodination at C–21 followed by acetolysis in accordance with the method set forth by Stork et al. in U.S. 2,874,154, issued on February 17, 1959, to produce 16β-methyl-21-acetoxy-Δ$^{4,16}$-pregnadiene-3,20-dione. The latter compound is hydroxylated by the procedure described by Petrow et al., J. Chem. Soc. 1955, 4373 with potassium permanganate to produce the 21-acetate of 16β-methyl-Δ$^4$-pregnene-16α,17α,21-triol-3,20-dione which upon treatment with dilute methanolic potassium hydroxide results in the free 16β-methyl-Δ$^4$-pregnene-16α,17α,21-triol-3,20-dione. Incubation of the latter compound with species of *Cunninghamella bainieri* ATCC 9244 effects introduction of the hydroxyl group at C–11 to produce 16β-methyl-Δ$^4$-pregnene-11β,16α,17α,21-tetrol-3,20-dione which is transformed into the 16,17-cyclic ketal or acetal by reaction with a ketone such as acetone or an aldehyde in the presence of catalytic amounts of perchloric acid. Acetylation at C–21 by conventional esterification as with acetic anhydride in pyridine produces the 16α,17α-ketal or acetal of the 21-acetate of 16β-methyl-Δ$^4$-pregnene-11β,16α,17α,21-tetrol-3,20-dione which is then subjected to oxidation as with chromic acid in dilute acetic acid to oxidize the 11-hydroxy group to the keto group. The 16α,17α-dihydroxy groups are regenerated by treatment of the 16α,17α-cyclic ketal or acetal with aqueous formic acid under reflux conditions thus yielding the 21-acetate of 16β-methyl-Δ$^4$-pregnene-16α,17α,21-triol-3,11,20-trione.

Alternatively, the 21-acetate of 16β-methyl-Δ$^4$-pregnene-16α,17α,21-triol-3,20-dione can be converted into the corresponding 16,17-acetonide whose 21-acetoxy group in turn can be saponified to form the acetonide of 16β-methyl-Δ$^4$-pregnene-16α,17α,21-triol-3,20-dione which can then be incubated as set forth previously to introduce the hydroxyl group at C–11. Reesterification of the C–21 hydroxy group by conventional means and regeneration of the 16α,17α-dihydroxy groups in the manner stated above results in the 21-acylate of 16β-methyl-Δ$^4$-pregnene-11β,16α,17α,21-tetrol-3,20-dione which can then be transformed into 16β-methyl-Δ$^4$-pregnene-16α,17α,21-triol-3,11,20-trione-21-acylate by chromic acid oxidation.

The dehydrogenation between C–1 and C–2 can be carried out by known purely chemical methods as by treatment with selenium dioxide in the presence of pyridine and in mixture with tertiary butanol under reflux conditions or by microbiological methods as by incubation with *Corynebacterium simplex* ATCC 6946.

In another aspect of this invention, there can be formed the 1-dehydro derivative of the acetonide of 16β-methyl-Δ$^4$-pregnene-16α,17α,21-triol-3,20-dione-21-acetate which upon treatment with dilute methanolic potassium hydroxide results in the formation of the free 16β-methyl-Δ$^{1,4}$-pregnadiene-16α,17α,21-triol-3,20-dione. The latter compound incubation with a culture of *Cunninghamella bainieri* ATCC 9244 is transformed into the acetonide of 16β-methyl-Δ$^{1,4}$-pregnadiene-11β,16α,17α,21-tetrol-3,20-dione. Acetylation at C–21 by conventional methods followed by oxidation with chromic acid in dilute acetic acid and regeneration of the 16α,17α-dihydroxy groups in the manner heretofore set forth results in the formation of the 16β-methyl-Δ$^{1,4}$-pregnadiene-16α,17α,21-triol-3,11,20-trione.

The 11β-hydroxyl group, which can be introduced prior to or subsequent to dehydrogenation between C–1 and C-2 and/or acetal or ketal formation, can be oxidized to the keto group also before or after the dehydrogenation or ketalization steps.

There can be further introduced a 9α-halo substituent (chloro, fluoro or bromo) in the novel compounds of this invention by known methods as disclosed by Fried et al., J. Am. Chem. Soc. 79, 1130 (1957) to produce other potent cortical hormones.

The invention is further illustrated but not limited by the following examples:

*Example 1*

A solution of 8 g. of 16-methyl-16-dehydroprogesterone described by Wettstein et al. in Helv. Chim. Acta. XXVII 1803 (1944), in 60 cc. of pure tetrahydrofurane and 36 cc. of methanol was slowly treated under continuous stirring with 12 g. of calcium oxide and then with 12 g. of iodine. The mixture was stirred at room temperature until the color of iodine disappeared almost completely, which took about 4 hours; the calcium oxide was removed by filtration, the filter was washed with methylene-chloride, the filtrate and washings were combined, water and more methylene chloride were added and the organic layer was separated, washed with dilute aqueous sodium thiosulfate solution and then with water, dried over anhydrous sodium sulfate and the solvent was evaporated under reduced pressure, avoiding overheating; there was thus obtained the crude 16-methyl-21-iodo-Δ$^{4,16}$-pregnadiene-3,20-dione which was used for the next step without further purification.

A mixture of the above iodo compound, 100 cc. of dry acetone and 20 g. of recently fused potassium acetate was refluxed for 15 hours; the solvent was evaporated under reduced pressure and the residue was treated with 120 cc. of methanol and 2.5 g. of sodium bisulfite dissolved in 20 cc. of water; the mixture was refluxed for 1 hour, cooled, poured into water and the precipitate was collected by filtration, washed and dried. Recrystallization from acetone-methanol yielded 16-methyl-16-dehydro-desoxycorticosterone 21 - acetate; M.P. 185–188° C.; $[\alpha]_D$ +81° (chloroform); $\lambda_{max.}$ 244 m$\mu$, log $\epsilon$ 4.36.

A solution of 3.5 g. of the above compound in 120 cc. of pure acetone containing 0.2 cc. of acetic acid was treated with a solution of 1.75 g. of potassium permanganate in 50 cc. of 85% aqueous acetone in the course of about 10 minutes, with continuous stirring at 0° C.; the mixture was then stirred for 30 minutes further at 0° C., filtered through celite and the filtrate was treated with 1 g. of sodium bisulfite in 10 cc. of water and then with 10 cc. of dilute hydrochloric acid (1:10); the acetone was evaporated under reduced pressure and at room temperature, the residue was extracted with methylene chloride and the extract was washed with water, dried over anhydrous sodium sulfate and the solvent was evaporated under reduced pressure; the residue was purified on 100 g. of silica gel and thus there was obtained the 21-acetate of 16β-methyl-Δ$^4$-pregnene-16α,17α,21-triol-3,20-dione; M.P. 223–226° C.; $[\alpha]_D$ +241° (chloroform); $\lambda_{max.}$ 240 m$\mu$, log $\epsilon$ 4.22.

3.3 g. of the above compound was mixed with 50 cc. of 1% methanolic potassium hydroxide solution and kept at a temperature around 0° C. for 1 hour under an atmosphere of nitrogen and with continuous stirring; the mixture was then acidified with acetic acid, concentrated to a small volume under reduced pressure, diluted with water and the precipitate was collected by filtration, washed with water, dried and recrystallized from acetone-hexane. There was thus obtained the free 16β-methyl-Δ$^4$-pregnene-16α,17α,21-triol-3,20-dione.

A culture of *Cunninghamella bainieri* ATCC 9244 was prepared by inoculating 10 lt. of an aqueous medium containing 2% of peptone and 5% of corn syrup with a vegetating culture of such fungus in the same medium and then stirring with aeration for 24 hours at 28° C. To each liter of this culture was added 30 cc. of an ethanol solution of 300 mg. of 16β-methyl-Δ$^4$-pregnene-16α,17α,21-triol-3,20-dione and the mixture was stirred with aeration for 24 hours at 28° C. The product was extracted with methylene chloride, the extract was washed with water, dried over anhydrous sodium sulfate, filtered and concentrated to a small volume under reduced pressure. The total concentrated extracts were adsorbed in a column charged with 60 g. of silica gel and 60 g. of celite previously washed with methylene chloride. The fraction eluted with methylene chloride-acetone 90:10 was evaporated and the residue recrystallized from methylene chloride-acetone. There was thus obtained 16β-methyl-16α-hydroxy-hydrocortisone.

2 g. of the above compound was treated with 2 cc. of acetic anhydride in solution in 10 cc. of pyridine and the mixture was kept at room temperature for 4 hours and then poured into ice water; the precipitate was collected, washed with water, dried and recrystallized from acetone-hexane, thus affording the 21-acetate of 16β-methyl-16α-hydroxy-hydrocortisone.

*Example 2*

A mixture of 2 g. of 16β-methyl-16α-hydroxy-hydrocortisone and 50 cc. of acetone was treated with 0.1 cc. of 70% perchloric acid and the mixture was stirred at room temperature for 2 hours, diluted with 250 cc. of water and the product was extracted with ethyl acetate; the extract was washed with aqueous sodium bicarbonate solution and water, dried over anhydrous sodium sulfate and the solvent was evaporated. Crystallization of the residue yielded the acetonide of 16β-methyl-16α-hydroxy-hydrocortisone.

Acetylation of the above compound, by the procedure described in the previous example, gave the 21-acetate of the acetonide of 16β-methyl-16α-hydroxy-hydrocortisone.

A mixture of 1 g. of the above compound and 50 cc. of acetic acid was treated with a solution of 200 mg. of chromium trioxide in 20 cc. of 50% acetic acid and stirred for 2 hours at a temperature around 15° C.; after diluting with water the precipitate was collected, washed with water, dried and recrystallized from acetone-hexane, thus furnishing the 21-acetate of the acetonide of 16β-methyl-16α-hydroxy-cortisone.

Upon subsequent heating of 500 mg. of the above compound with 30 cc. of 60% formic acid on the steam bath for 1 hour, followed by diluting with water the cooled mixture, collecting the precipitate and recrystallizing from acetone-hexane there was obtained the 21-acetate of 16β-methyl-16α-hydroxy-cortisone.

By treatment with methanolic potassium hydroxide solution (as described previously) there was obtained the free 16β-methyl-16α-hydroxy-cortisone.

*Example 3*

2 g. of 16β-methyl-Δ$^4$-pregnene-16α,17α,21-triol-3,20-dione, prepared in accordance with the method of the preceding example, was treated with acetone and perchloric acid, in accordance with the reaction conditions described in the same example, to give the acetonide of 16β-methyl-Δ$^4$-pregnen-16α,17α,21-triol-3,20-dione.

The above compound was acetylated in a conventional manner, thus yielding the 21-acetate of the acetonide of 16β-methyl-Δ$^4$-pregnene-16α,17α,21-triol-3,20-dione.

*Example 4*

30 cc. of a 1% aqueous yeast extract medium was placed in each of 30 Erlenmeyer flasks of 125 cc. and the contents of each flask was inoculated with a culture of *Corynebacterium simplex* ATCC 6946 obtained by incubation for 74 hours of an aqueous medium of 1% yeast extract with a suspension of such bacteria. The medium thus inoculated was stirred for 24 hours at 28° C. There was thus obtained the culture of Corynebacterium which was employed for the incubation with the steroid.

To each flask there was then added 1 cc. of 1% ethanol solution of 16β-methyl-16α-hydroxy-hydrocortisone, prepared as described in Example 1. This solution of the steroid was prepared in distilled ethanol, without heating and just before its use. The mixtures were then incubated for 24 hours at 28° C. with continuous stirring; in other experiments the incubation time was extended to 72 hours, without altering the result of the incubation.

The contents of the flasks were combined in three fractions and each was extracted with 5 portions of 500 cc. each of methylene chloride. The extracts were combined, washed with water, dried over anhydrous sodium sulfate and the methylene dichloride was evaporated. The residue was purified by chromatography on washed alumina, eluting the product with mixtures of benzene and ether. Recrystallization from ethyl acetate yielded 16β-methyl-16α-hydroxy-prednisolone. Acetylation of the above compound in accordance with the method described in Example 1, gave the corresponding 21-acetate of 16β-methyl-16α-hydroxy-prednisolone.

300 mg. of this acetate were oxidized with chromium trioxide in acetic acid, by the method of Example 1, thus yielding the 21-acetate of 16α-methyl-16α-hydroxy-prednisone. The above compound was treated with acetone and perchloric acid, in accordance with the method described in Example 1, thus producing the acetonide of 16β-methyl-16α-hydroxy-prednisone acetate, saponification of the latter with 1% methanolic potassium hydroxide solution gave the acetonide 16β-methyl-16α-hydroxy-prednisone.

*Example 5*

A solution of 1 g. of 16β-methyl-16α-hydroxy-prednisolone, prepared as described in Example 4, in 50 cc. of benzene was treated with 0.5 g. of paraldehyde and 1 cc. of 4 N perchloric acid and stirred at room temperature for 2 hours, the organic layer was separated, successively washed with 5% aqueous sodium bicarbonate solution and water, dried over anhydrous sodium sulfate and the benzene was evaporated. Recrystallization of the residue from acetone-hexane afforded 16β-methyl-16α,17α - methylenedioxy - Δ¹,⁴ - pregnadiene-11β,21-diol-3,20-dione.

*Example 6*

In accordance with the method of the previous example, the 21-acetate of 16β-methyl-16α-hydroxy-cortisone obtained as described in Example 2, was converted into the acetate of 16β-methyl-16α,17α-methylenedioxy-Δ⁴-pregnen-21-ol-3,11,20-trione.

*Example 7*

A stirred mixture of 1 g. of the 21-acetate of the acetonide of 16β-methyl-Δ⁴-pregnene-16α,17α,21-triol-3,20-dione, obtained as described in Example 3, 50 cc. of t-butanol, 400 mg. of selenium dioxide and 0.2 cc. of pyridine was refluxed under an atmosphere of nitrogen for 48 hours. It was then filtered through celite and the filtrate evaporated to dryness under reduced pressure, the residue was purified by chromatography on silica gel. There was thus obtained the 21-acetate of the acetonide of 16β-methyl-Δ¹,⁴-pregnadiene - 16α,17α,21 - triol - 3,20-dione. Treatment of the above compound with 1% methanolic potassium hydroxide in accordance with the method of Example 1, gave the free acetonide of 16β-methyl-Δ¹,⁴-pregnadiene-16α,17α,21-triol-3,20-dione.

The above compound was subjected to the microbiological oxidation with a culture of *Cunninghamella bainieri* ATCC 9244, in accordance with the method described also in Example 1, thus producing the acetonide of 16β-methyl - Δ¹,⁴-pregnadiene - 11β,16α,17α,21 - tetrol - 3,20-dione.

Upon acetylation of the latter compound in a conventional manner, followed by oxidation with chromium trioxide in acetic acid, in accordance with the method described in Example 2, there was obtained the 21-acetate of the acetonide of 16β-methyl-Δ¹,⁴-pregnadiene-16α,17α,21-triol-3,11,20-trione, identical with that obtained in Example 4.

*Example 8*

In accordance with the method described in Example 1, the acetonide of 16β-methyl-Δ⁴-pregnen-16α,17α,21-triol-3,20-dione, obtained as described in Example 3, was incubated with a culture of *Cunninghamella bainieri* ATCC 9244 to produce the acetonide of 16β-methyl-Δ⁴-pregnene-11β,16α,17α,21-tetrol-3,20 - dione. Acetylation of the above compound at C–21 followed by treatment with 60% formic acid, by applying the method described in Example 2, gave the 21-acetate of 16β-methyl-Δ⁴-pregnene-11β,16α,17α,21-tetrol-3,20-dione.

Oxidation of the above compound with chromium trioxide in acetic acid, in accordance with the method described in Example 2, afforded the 21-acetate of 16β-methyl-Δ⁴-pregnene-16α,17α,21-triol-3,11,20-trione.

We claim:

1. A compound of the following formula:

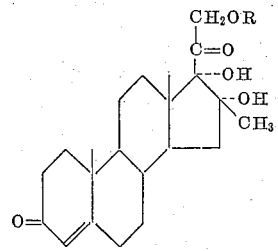

wherein R is selected from the group consisting of hydrogen and a hydrocarbon carboxylic acyl group of less than 12 carbon atoms.

2. 16β - methyl - Δ⁴ - pregnene - 16α,17α,21 - triol - 3,20-dione-21-monoacetate.

3. A compound of the following formula:

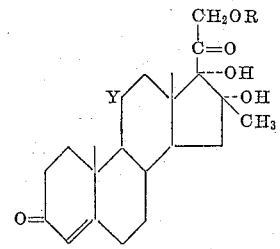

wherein Y is selected from the group consisting of keto and β-hydroxy and R is selected from the group consisting of hydrogen and a hydrocarbon carboxylic acyl group of less than 12 carbon atoms.

4. 16β - methyl - Δ⁴ - pregnene - 11β,16α,17α,21 - tetrol-3,20-dione.

5. 16β - methyl - Δ⁴ - pregnene - 11β,16α,17α,21 - tetrol-3,20-dione-21-acetate.

6. 16β - methyl - Δ⁴ - pregnene - 16α,17α,21 - triol - 3,11,20-trione.

7. 16β - methyl - Δ⁴ - pregnene - 16α,17α,21 - triol - 3,11,20-trione-21-acetate.

8. A compound of the following formula:

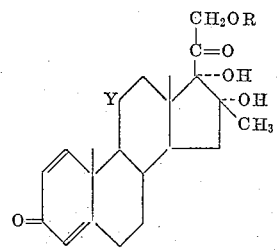

wherein Y is selected from the group consisting of keto and β-hydroxy and R is selected from the group consisting of hydrogen and a hydrocarbon carboxylic acyl group of less than 12 carbon atoms.

9. 16β - methyl - Δ¹,⁴ - pregnadiene - 11β,16α,17α,21 - tetrol-3,20-dione.

10. 16β - methyl - Δ¹,⁴ - pregnadiene - 11β,16α,17α,21-tetrol-3,20-dione-21-acetate.

11. 16β - methyl - Δ¹,⁴ - pregnadiene - 16α,17α,21 - triol-3,11,20-trione-21-acetate.

12. A compound of the following formula:

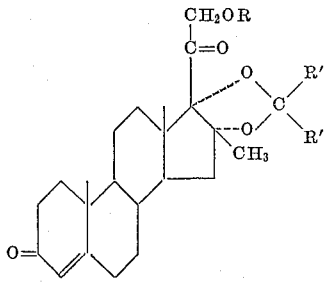

wererin R is selected from the group consisting of hydrogen and a hydrocarbon carboxylic acyl group of less than 12 carbon atoms; and R' is selected from the group consisting of hydrogen and a hydrocarbon radical containing 1 to 8 carbon atoms.

13. 16β - methyl - 16α,17α - isopropylidenedioxy - Δ⁴-pregnene-21-ol-3,20-dione.

14. 16β - methyl - 16α,17α - isopropylidenedioxy - Δ⁴-pregnene-21-ol-3,20-dione-21-acetate.

15. A compound of the following formula:

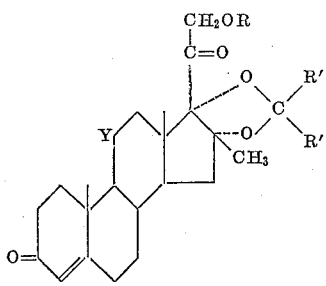

wherein Y is selected from the group consisting of keto and β-hydroxy; R is selected from the group consisting of hydrogen and a hydrocarbon carboxylic acyl group of less than 12 carbon atoms; and R' is selected from the group consisting of hydrogen and a hydrocarbon radical containing 1 to 8 carbon atoms.

16. 16β - methyl - 16α,17α - isopropylidenedioxy - Δ⁴-pregnene-11β,21-diol-3,20-dione.

17. 16β - methyl - 16α,17α - isopropylidenedioxy - Δ⁴-pregnene-11β,21-diol-3,20-dione-21-acetate.

18. 16β - methyl - 16α,17α - methylenedioxy - Δ⁴ - pregnene-21-ol-3,11,20-trione.

19. 16β - methyl - 16α,17α - isopropylidene - dioxy - Δ⁴-pregnene-21-ol-3,11,20-trione-21-acetate.

20. A compound of the following formula:

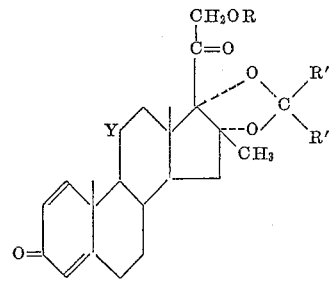

wherein Y is selected from the group consisting of keto and β-hydroxy; R is selected from the group consisting of hydrogen and a hydrocarbon carboxylic acyl group of less than 12 carbon atoms; and R' is selected from the group consisting of hydrogen and a hydrocarbon radical containing 1 to 8 carbon atoms.

21. 16β - methyl - 16α,17α - methylenedioxy - Δ¹,⁴-pregnadiene-11β,21-diol-3,20-dione.

22. 16β - methyl - 16α,17α - isopropylidenedioxy - Δ¹,⁴-pregnadiene-21-ol-3,11,20-trione.

23. 16β - methyl - 16α,17α - isopropylidenedioxy - Δ¹,⁴-pregnadiene-21-ol-3,11,20-trione-21-acetate.

24. Compounds selected from the group consisting of those having the formula:

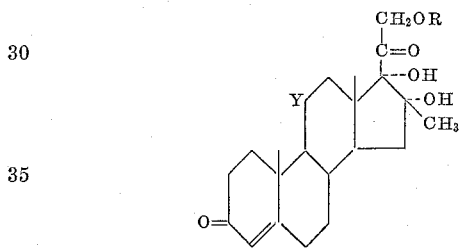

and the 1-dehydro derivatives thereof, wherein Y is selected from the group consisting of keto and β-hydroxy and R is selected from the group consisting of hydrogen and lower alkanoyl.

References Cited in the file of this patent
UNITED STATES PATENTS 2,777,864 Bernstein et al. _____ Jan. 15, 1957
2,789,118 Bernstein et al. _____ Apr. 16, 1957
2,806,043 Bernstein et al. _____ Sept. 10, 1957

OTHER REFERENCES

Allen et al.: Journal Am. Chemical Soc. (1955), vol. 77, pages 1028–32.
Oliveto et al.: Journal Am. Chem. Soc. (1958), vol. 80, page 4428.
Bernstein et al. (4): Journal of Am. Chem. Soc. (1959), vol. 81, pages 45–73.